United States Patent [19]

Mihalik

[11] 4,204,698
[45] May 27, 1980

[54] CHILD'S SCOOTER

[76] Inventor: Nicholas Mihalik, 98-25 65th Rd., Forest Hills, N.Y. 11374

[21] Appl. No.: 961,713

[22] Filed: Nov. 17, 1978

[51] Int. Cl.² .............................................. B62K 9/00
[52] U.S. Cl. ......................... 280/87.04 R; 280/1.11 R
[58] Field of Search ................. 280/87.04 R, 87.04 A, 280/87.04 B, 87.02, 87.05, 1.12, 1.11 R, 1.1 R

[56] References Cited

U.S. PATENT DOCUMENTS

| D. 170,610 | 10/1953 | Sebel | 280/1.11 R |
|---|---|---|---|
| 2,460,395 | 2/1949 | Reid | 280/87.04 R |
| 2,660,442 | 11/1953 | Wiesner et al. | 280/87.05 |

FOREIGN PATENT DOCUMENTS

| 26760 | 3/1924 | France | 280/87.04 R |
|---|---|---|---|
| 346446 | 6/1960 | Switzerland | 280/87.04 R |
| 310589 | 5/1929 | United Kingdom | 280/87.05 |

Primary Examiner—John J. Love
Assistant Examiner—Donn McGiehan
Attorney, Agent, or Firm—Daniel Jay Tick

[57] ABSTRACT

A child's scooter has a carriage with an elongated platform for supporting a foot of a user. The platform is planar with a front and a spaced rear and curves upward in the area of the front thereof to approximately 90° with the remainder of the platform. A cover of high friction material on the platform prevents slippage of the foot. A frame extends around the front and sides of the platform. A tubular member is affixed to the frame at the front of the platform and extends parallel to the front and perpendicular to the remainder of the platform. A steering shaft is rotatably mounted in the tubular member and has spaced opposite top and bottom ends. A forked part extends colinearly from the bottom end of the steering shaft. Handlebars extend from the top end of the steering shaft. A front wheel is rotatably mounted in the forked part. A rear wheel is rotatably mounted at the rear of the platform.

5 Claims, 4 Drawing Figures

CHILD'S SCOOTER

BACKGROUND OF THE INVENTION

The present invention relates to a child's scooter.

The principal object of the invention is to provide a child's scooter of simple, but sturdy structure which is modern in appearance.

An object of the invention is to provide a child's scooter which is of simple structure, inexpensive in manufacture, and provides considerable amusement, enjoyment and exercise for children of all ages.

Another object of the invention is to provide a child's scooter which is very easy to maintain and requires little or no repair.

Still another object of the invention is to provide a child's scooter which functions efficiently, effectively, reliably and safely to transport a child under his own power, and has the appearance of a modern vehicle.

BRIEF SUMMARY OF THE INVENTION

In accordance with the invention a child's scooter comprises a carriage having an elongated platform for supporting a foot of a user. The platform is substantially planar with a front and a spaced rear and curves upward in the area of the front thereof to approximately 90° with the remainder of the platform. A cover of high friction material on the platform prevents slippage of the foot and a frame extends around the front and sides of the platform. A tubular member is affixed to the frame at the front of the platform and extends substantially parallel to the front and substantially perpendicular to the remainder of the platform. A steering shaft is rotatably mounted in the tubular member and has spaced opposite top and bottom ends. A forked part extends substantially colinearly from the bottom end of the steering shaft. Handlebars extend from the top end of the steering shaft. A front wheel is rotatably mounted in the forked part. A rear wheel is rotatably mounted at the rear of the platform.

Front and rear fenders cover approximately one third of the front and rear wheels, respectively.

A pair of mock exhaust pipe end parts are affixed to opposite sides of the frame at the rear thereof.

The tubular member is affixed to the frame via a collar surrounding the tubular member. A positioning collar surrounds the steering shaft and is affixed thereto for preventing upward sliding of the tubular member.

A luggage rack is provided on the rear fender and is affixed to the rear fender and the platform.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figures 1, 4:
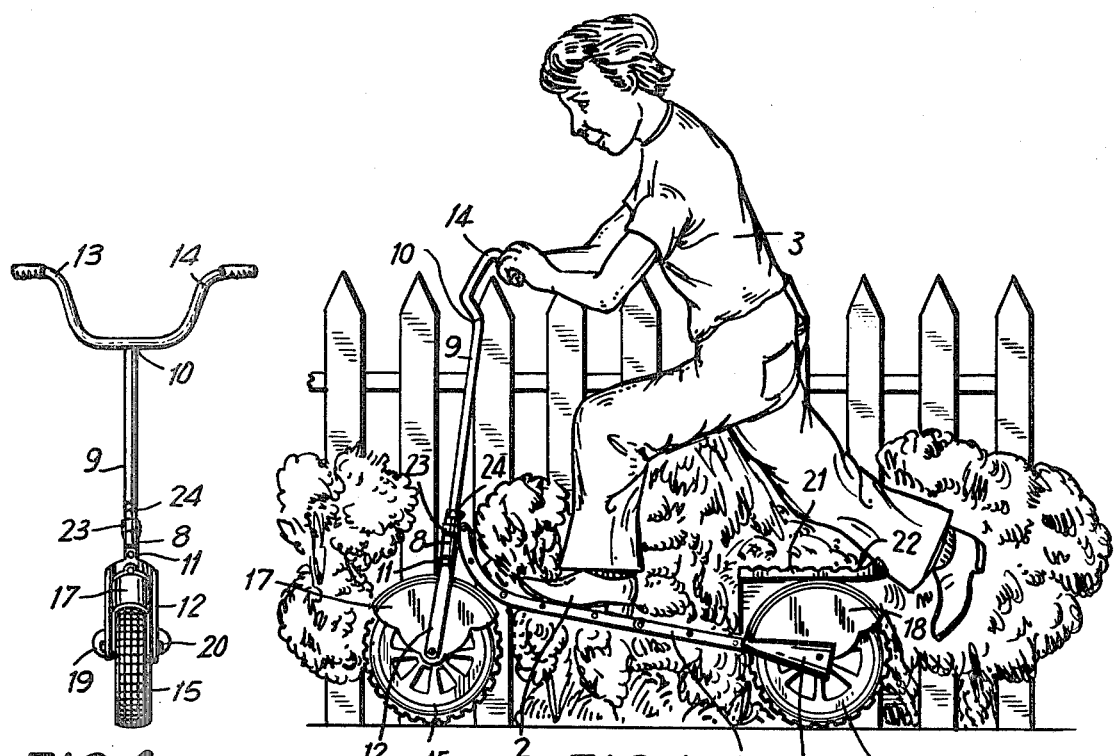
FIG. 1 is a side view of an embodiment of the scooter of the invention in use.
FIG. 4 is a front view of the embodiment of FIG. 1, at rest.
Figure 2:
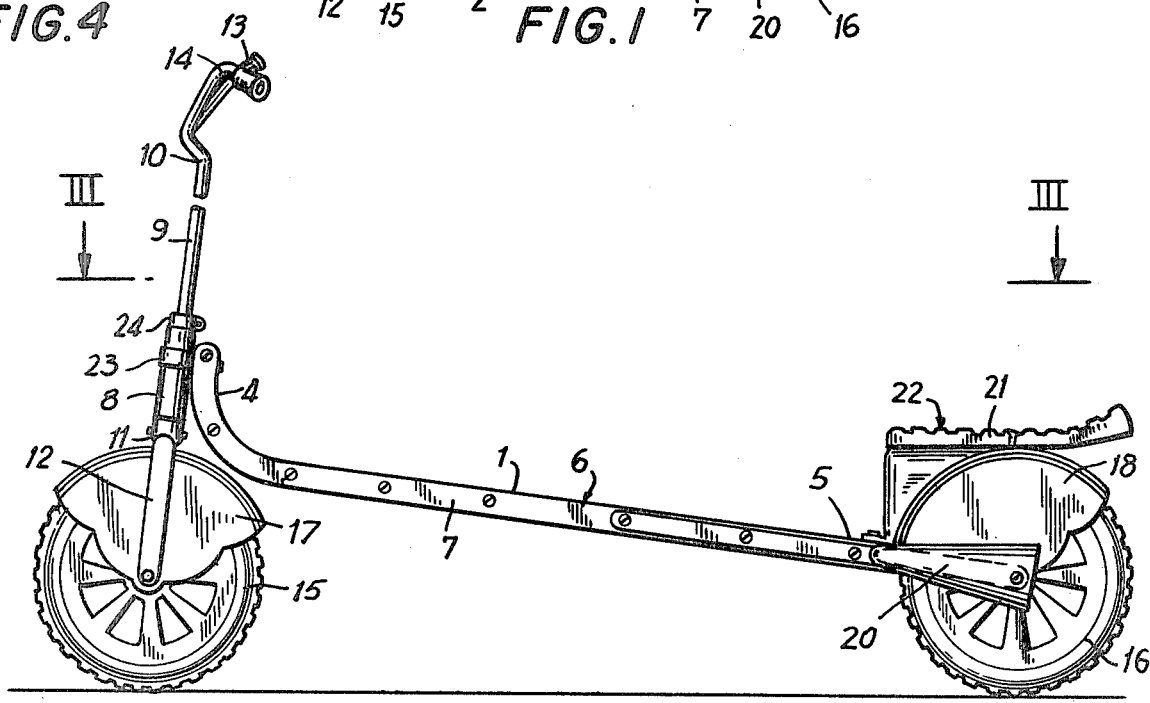
FIG. 2 is a side view, on an enlarged scale, of the embodiment of FIG. 1.
Figure 3:
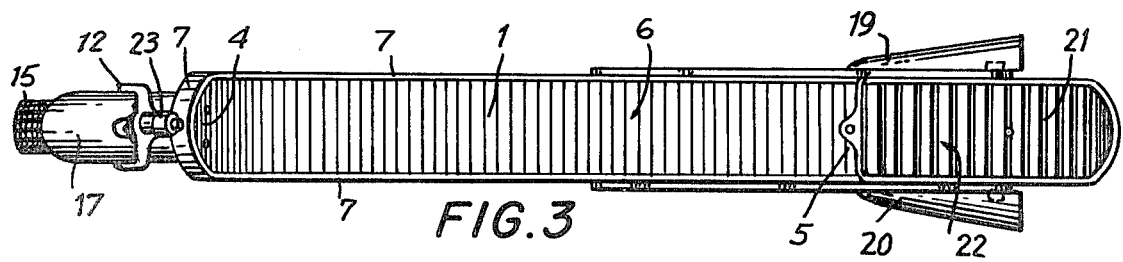
FIG. 3 is a top view, taken along the lines III—III, of FIG. 2.

The child's scooter of the invention comprises a carriage having an elongated platform 1 (FIG. 3) for supporting a foot 2 (FIG. 1) of a user 3 (FIG. 1). The platform 1 is substantially planar, as shown in FIGS. 1 to 3, with a front 4 and a spaced rear 5 (FIGS. 2 and 3). The platform 1 curves upward in the area of the front 4 thereof to approximately 90° with the remainder of said platform, as shown in FIGS. 1 to 3. A cover 6 of high friction material such as, for example, ridged rubber, is provided on the platform 1, as shown in FIG. 3, to prevent slippage of the foot 2 of the user 3. A frame 7 extends around the front and sides of the platform 1, as shown in FIGS. 1 to 3.

A tubular member 8 is affixed to the frame 7 at the front 4 of the platform 1 (FIGS. 1, 2 and 4) and extends substantially parallel to said front and substantially perpendicular to the remainder of said platform.

A steering shaft 9 (FIGS. 1, 2 and 4) is rotatably mounted in the tubular member 8 and has spaced opposite top and bottom ends 10 and 11, respectively, as shown in FIGS. 1, 2 and 4.

Handlebars 13 and 14 (FIGS. 2 and 4) extend from the top end 10 of the steering shaft 9.

A front wheel 15 is rotatably mounted in the forked part 12, as shown in the FIGS. A rear wheel 16 is rotatably mounted at the rear 5 of the platform 1, as shown in FIGS. 1 and 2.

Front and rear fenders 17 and 18 cover approximately one third of the front and rear wheels 15 and 16, respectively, as shown in FIGS. 1 and 2.

A pair of mock exhaust pipe end parts 19 and 20 (FIGS. 3 and 4) are affixed to opposite sides of the frame 7 at the rear thereof.

A luggage rack 21 (FIGS. 1 to 3) is mounted on the rear fender 18, as shown in FIGS. 1 and 2. The luggage rack 21 is affixed to the rear fender 18 and the platform 1 and has a cover 22 of high friction material such as, for example, ridged rubber, as shown in FIGS. 2 and 3, to enable it to retain items placed thereon.

The tubular member 8 is affixed to the frame 7 via a collar 23 (FIGS. 1 to 4). The collar 23 surrounds the tubular member 8. A positioning collar 24 (FIGS. 1, 2 and 4) surrounds the steering shaft 9 and is affixed thereto at the upper end of the tubular member 8 to prevent upward sliding of said tubular member.

While the invention has been described by means of a specific example and in a specific embodiment, I do not wish to be limited thereto, for obvious modifications will occur to those skilled in the art without departing from the spirit and scope of the invention.

I claim:

1. A child's scooter, comprising
    a carriage having an elongated platform for supporting a foot of a user, said platform being substantially planar with a front and a spaced rear and curving upward in the area of the front thereof to approximately 90° with the remainder of said platform, a cover of high friction material on the platform to prevent slippage of the foot and a frame extending around the front and sides of the platform;
    a collar;
    a tubular member surrounded by said collar and affixed to the frame via said collar at the front of the platform, said tubular member extending substantially parallel to said front and substantially perpendicular to the remainder of said platform;

a steering shaft rotatably mounted in the tubular member and having spaced opposite top and bottom ends;

a forked part extending substantially colinearly from the bottom end of the steering shaft;

handlebars extending from the top end of said steering shaft;

a front wheel rotatably mounted in the forked part; and a rear wheel rotatably mounted at the rear of said platform.

2. A child's scooter as claimed in claim 1, further comprising front and rear fenders covering approximately one third of the front and rear wheels, respectively, and a luggage rack on the rear fender and affixed to said rear fender and said platform.

3. A child's scooter as claimed in claim 1, further comprising a pair of mock exhaust pipe end parts affixed to opposite sides of said frame at the rear thereof.

4. A child's scooter as claimed in claim 1, further comprising a positioning collar surrounding said steering shaft and affixed thereto for preventing upward sliding of said tubular member.

5. A child's scooter as claimed in claim 1, wherein said platform has a predetermined width throughout its length including the area of the front thereof.

* * * * *